United States Patent
Maes et al.

(10) Patent No.: US 12,359,715 B2
(45) Date of Patent: Jul. 15, 2025

(54) BYPASS FOR PURGING AN OIL CIRCUIT

(71) Applicant: ZF FRIEDRICHSHAFEN AG, Friedrichshafen (DE)

(72) Inventors: Andy Maes, Sinaai (BE); Bert Verdyck, Friedrichshafen (DE); Stijn Rottiers, Lokeren (BE); Wim De Laet, Antwerp (BE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/567,373

(22) PCT Filed: Jul. 8, 2022

(86) PCT No.: PCT/EP2022/069024
§ 371 (c)(1),
(2) Date: Dec. 6, 2023

(87) PCT Pub. No.: WO2023/016717
PCT Pub. Date: Feb. 16, 2023

(65) Prior Publication Data
US 2024/0288059 A1   Aug. 29, 2024

(30) Foreign Application Priority Data

Aug. 10, 2021   (DE) ..................... 10 2021 208 683.7

(51) Int. Cl.
  *F16H 57/04*   (2010.01)
  *F03D 15/00*   (2016.01)
  *F16H 57/02*   (2012.01)

(52) U.S. Cl.
  CPC ....... *F16H 57/0408* (2013.01); *F16H 57/042* (2013.01); *F16H 57/0435* (2013.01);
(Continued)

(58) Field of Classification Search
  CPC .. F03D 15/00; F16H 57/0436; F16H 57/0408; F16H 57/042; F16H 57/0435; F16H 57/0452; F16H 2057/02078
(Continued)

(56) References Cited

U.S. PATENT DOCUMENTS

| | | | | |
|---|---|---|---|---|
| 3,152,333 A | * | 10/1964 | Matt | ....................... F16N 17/00 184/6.12 |
| 5,099,715 A | * | 3/1992 | Baiker | ................ F16H 57/0456 184/6.12 |

(Continued)

FOREIGN PATENT DOCUMENTS

| | | |
|---|---|---|
| DE | 10157714 A1 | 6/2003 |
| EP | 2687758 A1 | 1/2014 |
| KR | 20180066416 A | 6/2018 |

*Primary Examiner* — Henry Y Liu
(74) *Attorney, Agent, or Firm* — LEYDIG, VOIT & MAYER, LTD.

(57) ABSTRACT

A gearbox arrangement with an oil circuit, including at least one lubrication point incorporated in the oil circuit and at least one direction control valve with at least two switching positions and at least three ports, the at least three ports including a first port, a second port, and a third port. In a first switching position the first port and the third port are connected to each other in an oil-conducting manner and disconnected from the second port. In a second switching position, the first port and the second port are connected to each other in an oil-conducting manner and disconnected from the third port. The lubrication point and the second port are connected to each other in an oil-conducting manner. The lubrication point and the third port are not connected to each other in an oil-conducting manner.

12 Claims, 1 Drawing Sheet

(52) U.S. Cl.
CPC ......... *F16H 57/0452* (2013.01); *F03D 15/00* (2016.05); *F16H 2057/02078* (2013.01); *F16H 57/0436* (2013.01)

(58) Field of Classification Search
USPC ...................................................... 184/6.12
See application file for complete search history.

(56) References Cited

U.S. PATENT DOCUMENTS

| | | | | |
|---|---|---|---|---|
| 5,318,080 | A * | 6/1994 | Viken | F01M 11/04 |
| | | | | 220/571 |
| 7,065,954 | B2 * | 6/2006 | Labala | F16C 33/6677 |
| | | | | 184/6.12 |
| 8,672,093 | B2 * | 3/2014 | Okano | F03D 80/70 |
| | | | | 184/6.12 |
| 8,707,815 | B2 * | 4/2014 | Voth | F16H 57/046 |
| | | | | 184/6.12 |
| 8,869,940 | B2 * | 10/2014 | Johnson | F03D 80/70 |
| | | | | 184/6.12 |
| 8,939,258 | B2 * | 1/2015 | Becker | F03D 15/10 |
| | | | | 184/6.12 |
| 8,939,259 | B2 * | 1/2015 | Mallada | F16H 57/0412 |
| | | | | 184/6.12 |
| 9,551,407 | B2 * | 1/2017 | Van Neerbos | F16H 47/02 |
| 10,060,415 | B2 * | 8/2018 | Bogaert | F03D 80/70 |
| 10,233,905 | B2 * | 3/2019 | Michaud | F16H 57/0402 |
| 10,495,070 | B2 * | 12/2019 | Adler | F16C 23/06 |
| 11,480,155 | B2 * | 10/2022 | Rogg | F03D 80/70 |
| 11,512,681 | B2 * | 11/2022 | Rogg | F16H 57/045 |
| 11,619,210 | B2 * | 4/2023 | Nies | F16H 57/045 |
| | | | | 184/4 |
| 11,713,750 | B2 * | 8/2023 | Demissie | F16C 17/02 |
| | | | | 416/170 R |
| 11,754,054 | B2 * | 9/2023 | Pedersen | F16H 57/0435 |
| | | | | 184/4 |
| 2003/0098147 | A1 | 5/2003 | Kemmerer et al. | |
| 2003/0155182 | A1 * | 8/2003 | Sich | F16H 61/664 |
| | | | | 184/6.12 |
| 2005/0034925 | A1 * | 2/2005 | Flamang | F16H 57/0434 |
| | | | | 184/6.12 |
| 2009/0191060 | A1 * | 7/2009 | Bagepalli | F03D 80/70 |
| | | | | 184/6.12 |
| 2010/0007151 | A1 * | 1/2010 | Ciszak | F16H 57/043 |
| | | | | 184/6.12 |
| 2010/0018807 | A1 * | 1/2010 | Grenfeldt | F16H 57/0456 |
| | | | | 184/6.12 |
| 2011/0024236 | A1 * | 2/2011 | Yano | F03D 80/70 |
| | | | | 184/6.12 |
| 2011/0168494 | A1 * | 7/2011 | Subramaniam | F03D 80/70 |
| | | | | 184/6.12 |
| 2011/0168495 | A1 * | 7/2011 | Subramaniam | F03D 80/70 |
| | | | | 184/6.12 |
| 2012/0241258 | A1 * | 9/2012 | Subramaniam | F16N 7/40 |
| | | | | 184/6.4 |
| 2013/0001017 | A1 * | 1/2013 | Saenz de Ugarte Sevilla | F03D 80/70 |
| | | | | 184/6.12 |
| 2013/0011263 | A1 * | 1/2013 | Subramaniam | F16N 7/40 |
| | | | | 184/6.12 |
| 2013/0288843 | A1 * | 10/2013 | Baum | F16H 57/0436 |
| | | | | 184/14 |
| 2013/0333508 | A1 * | 12/2013 | Lundberg | F16H 61/0021 |
| | | | | 74/473.11 |
| 2014/0314569 | A1 * | 10/2014 | Michaud | F03D 15/00 |
| | | | | 416/174 |
| 2015/0051038 | A1 * | 2/2015 | Van Neerbos | F16H 47/02 |
| | | | | 475/83 |
| 2015/0345616 | A1 * | 12/2015 | Schweiher | F16H 57/045 |
| | | | | 184/6.12 |
| 2016/0298609 | A1 * | 10/2016 | Bogaert | F16H 57/0436 |
| 2018/0245571 | A1 * | 8/2018 | Adler | F15B 15/1428 |
| 2020/0124033 | A1 * | 4/2020 | Rogg | F16H 57/045 |
| 2020/0362835 | A1 * | 11/2020 | Demissie | F03D 80/70 |
| 2021/0048005 | A1 * | 2/2021 | Petersen | F01M 1/12 |
| 2021/0088029 | A1 * | 3/2021 | Rogg | F03D 15/00 |
| 2021/0115906 | A1 * | 4/2021 | Nies | F16H 57/045 |
| 2021/0246884 | A1 * | 8/2021 | Pedersen | F16N 7/38 |

\* cited by examiner

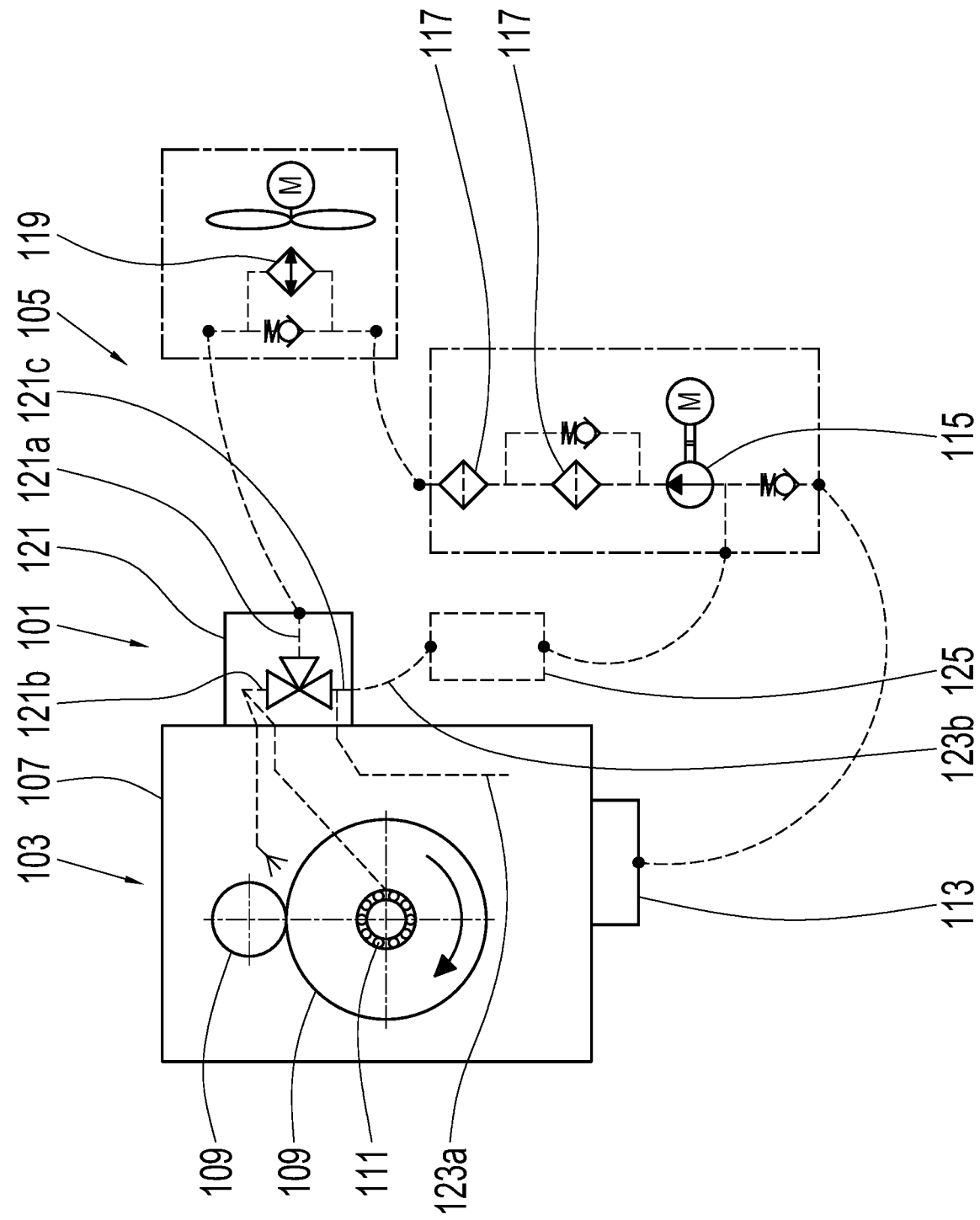

BYPASS FOR PURGING AN OIL CIRCUIT

This application is a U.S. National Phase application under 35 U.S.C. § 371 of International Application No. PCT/EP2022/069024, filed on Jul. 8, 2022, and claims benefit to German Patent Application No. DE 10 2021 208 683.7, filed on Aug. 10, 2021. The International Application was published in German on Feb. 16, 2023 as WO 2023/016717 A1 under PCT Article 21(2).

FIELD

The invention relates to a gearbox arrangement, a method of flushing a gearbox arrangement, and a method of repairing a gearbox arrangement.

BACKGROUND

An oil circuit of a wind turbine gearbox usually has an internal and an external part. The external part is characterized in that it is located outside a gearbox housing. The internal part is located inside the gearbox housing. Outside the gearbox housing, i.e. in the external part, components are arranged that must be accessible for maintenance purposes. Lubrication points of the gearbox, such as bearings or gear teeth, are located inside the gearbox and thus belong to the internal part of the oil circuit.

If the external part of the oil circuit is opened for maintenance purposes, there is a risk of impurities entering the oil circuit.

SUMMARY

In an embodiment, the present disclosure provides a gearbox arrangement with an oil circuit, comprising at least one lubrication point incorporated in the oil circuit and at least one direction control valve with at least two switching positions and at least three ports, the at least three ports including a first port, a second port, and a third port. In a first switching position the first port and the third port are connected to each other in an oil-conducting manner and disconnected from the second port. In a second switching position, the first port and the second port are connected to each other in an oil-conducting manner and disconnected from the third port. The lubrication point and the second port are connected to each other in an oil-conducting manner. The lubrication point and the third port are not connected to each other in an oil-conducting manner.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a gearbox arrangement.

DETAILED DESCRIPTION

In an embodiment, the present invention prevents increased wear or damage that otherwise occurs as a result of the ingress of impurities.

A gearbox arrangement refers to an arrangement comprising a gearbox. Presently, the arrangement further comprises an oil circuit. This is an arrangement of one or more oil lines. These oil lines are interconnected in an oil-conducting manner in such a way that the oil circulates in the oil circuit. Preferably, the oil circuit comprises a pump that conveys the oil through the oil circuit.

Presently, at least one lubrication point is incorporated in the oil circuit. This lubrication point is lubricated by the oil circulating in the oil circuit. Preferably, the lubrication point is disposed inside a gearbox housing. The lubrication point is, for example, a bearing or the teeth of a gearwheel.

According to an embodiment of the invention, the gearbox arrangement comprises at least one direction control valve with at least two switching positions and at least three ports, preferably with exactly two switching positions and/or exactly three ports. When the direction control valve is in a first switching position, it connects the first port and the third port to each other in an oil-conducting manner. The second port is separated in the first switching position from the first port and the third port. In the first switching position, the second port is separated from the first port and the third port. In the first switching position, therefore, there is no oil-conducting connection within the direction control valve, neither between the first port and the second port, nor between the second port and the third port.

In a second switching position, the direction control valve connects the first port and the second port in an oil-conducting manner. The third port is separated from the first port and the second port in the second switching position. In the second switching position, therefore, there is no oil-conducting connection within the directional control valve, neither between the first port and the third port, nor between the second port and the third port.

The lubrication point and the second port are connected to each other in an oil-conducting manner. The lubrication point can therefore be incorporated into the oil circuit via the second port. Oil circulating through the oil circuit is conducted from the second port to the lubrication point via a corresponding oil-conducting connection.

The lubrication point and the third port, on the other hand, are not connected to each other in an oil-conducting manner. This means that oil cannot reach the lubrication point from the third connection, but instead is routed past the lubrication point. A corresponding oil line, referred to below as a bypass, which can be connected to the third port in an oil-conducting manner, bypasses the lubrication point.

According to an embodiment of the invention, the first switching position of the direction control valve corresponds to a flushing position. The second switching position corresponds to an operating position. When the direction control valve is set to the flushing position, the oil in the oil circuit circulates via the bypass so that the lubrication point is bypassed. Possible impurities in the oil circuit can thus not enter the lubrication point and damage it.

By filtering and/or replacing the oil, the impurities can be removed from the oil circuit. It is then possible to switch to the operating position so that the lubrication point is incorporated in the oil circuit via the second port and supplied with oil.

For conveying the oil, the same pump is preferably used in the operating position as in the flushing position. This is advantageous because the arrangement can be flushed with the operating pump of the gearbox. It is not necessary to connect a separate pump to the oil circuit for flushing.

In a preferred embodiment, the third port is not only connected to the above-mentioned lubrication point, but also is not connected in an oil-conducting manner to any other lubrication point. This ensures that no lubrication point is damaged with impurities when the direction control valve is in the flushing position.

Preferably, the gearbox arrangement is further configured with at least one component that is integrated into the oil circuit and is connected to the first port in an oil-conducting manner. Accordingly, at least one oil-conducting connection connects the component and the first port to each other in an oil-conducting manner. The oil circulating in the oil circuit then flows from the component to the first port. The component is, for example, a pump, an oil filter, an oil cooler, or a conduit pipe.

The gearbox arrangement is further preferably configured in such a way that the above component is arranged outside the gearbox housing. This makes the component easily accessible so that it can be easily repaired or replaced.

An oil circuit preferably also includes an oil sump. This is an oil reservoir, i.e. a container for collecting oil, from which the oil circuit is fed. The oil is preferably conveyed out of the oil sump by a pump, such as the operating pump mentioned at the beginning, passes through the lubrication points, and finally flows back into the oil sump.

In a preferred embodiment, the third port is connected to the oil sump in an oil-conducting manner. As a result, oil exiting the direction control valve via the third port flows into the oil sump, bypassing the at least one lubrication point.

In a preferred embodiment, the third port is connected to a dirty oil tank in an oil-conducting manner. The dirty oil tank is used to collect oil for disposal. Unlike the oil sump, the oil circuit is not fed from the dirty oil tank. In particular, the dirty oil tank is thus different from the oil sump.

Furthermore, the dirty oil tank is preferably arranged outside the gearbox housing. This has the advantage that the dirty oil tank can be easily removed for disposal of the oil contained therein.

A method according to an embodiment of the invention is used for flushing the gearbox arrangement according to embodiments of the invention. The method provides that the direction control valve is moved to the first switching position. While the direction control valve is in the first switching position, oil circulates in the oil circuit. Preferably, this is performed with the operating pump of the gearbox. Any impurities possibly present in the oil circuit are flushed out, bypassing the at least one lubrication point.

The direction control valve is then moved to the second switching position. The oil circulating in the oil circuit then passes through at least one lubrication point so that the gearbox can be put into operation.

A method according to an embodiment of the invention serves for repairing the gearbox arrangement according to embodiments of the invention. Within the scope of this method, the component mentioned at the beginning is removed in order to be repaired or replaced. The repaired or replaced further component is then reinstalled. In order to flush out impurities that may have entered the oil circuit in the meantime, the gearbox arrangement is now flushed by carrying out the procedure described above. The direction control valve is thus moved to the first switching position before oil circulates through the oil circuit. In order to subsequently put the repaired gearbox arrangement into operation, the direction control valve is then moved to the second switching position.

The gearbox arrangement 101 shown in FIG. 1 includes a gearbox 103 and a lubricant supply device 105.

Gearwheels 109 are disposed in a housing 107 of the gearbox 103. Bearings 111 for supporting the gears 109 or shafts, on which the gears 109 are arranged, and teeth of the gears 109 form lubrication points. To prevent damage or premature failure due to increased wear, the lubrication points are supplied with oil by means of the lubricant supply device 105.

The housing 107 forms an oil sump, from which oil is introduced into the lubricant supply device 105 via an interface 113. To convey the oil, the lubricant supply device 105 has a pump 115. Filters 117 serve to filter out impurities from the oil. Furthermore, an oil cooler 119 is integrated into the lubricant supply device 105.

The lubricant supply device 105 is arranged outside the housing 107. This makes the components of the lubricant supply device 105 easily accessible for repair and maintenance work.

During repair and maintenance work, there is generally a risk of impurities entering the oil circuit. In order to prevent damage to the lubrication points due to the impurities, a switchable direction control valve 121 is provided. This has a first port 121a, a second port 121b and a third port 121c.

Oil from the lubricant supply device 105 enters the direction control valve 121 via the first port 121a. Depending on the switching position of the direction control valve 121, the oil exits from the second port 121b or from the third port 121c. During normal operation, the direction control valve 121 is switched so that the oil exits from the second port 121b. The second port 121b is connected to the lubrication points of the gearbox 103 in an oil-conducting manner. Thus, the lubrication points are supplied with oil via the second port 121b during normal operation.

After repair or maintenance work, the direction control valve 121 is switched over to realize a flushing operation. The oil then no longer exits via the second port 121b, but via the third port 121c. The oil exiting from the third port 121c does not enter the lubrication points of the gearbox 103, but instead flows around them. In FIG. 1 corresponding bypasses 123a, 123b are shown, which can be implemented alternatively or in combination.

A first bypass 123a extends within the housing 107. Oil discharged through the first bypass 123a drains off directly into the oil sump. From here, it enters the lubricant supply device 105 where it is filtered. Thus, by circulating the oil via the lubricant supply device 105 and the first bypass 123a, the impurities can be filtered out.

A second bypass 123b directs the oil into a tank 125. The oil collected in the tank 125 can be removed and replaced with fresh oil.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

- 101 gearbox arrangement
- 103 gearbox
- 105 lubricant supply device
- 107 housing
- 109 gear
- 111 bearing
- 113 interface
- 115 pump
- 117 filter
- 119 oil cooler
- 121 direction control valve
- 121a first port
- 121b second port
- 121c third port
- 123a first bypass
- 123b second bypass
- 125 tank

The invention claimed is:

1. A gearbox arrangement with an oil circuit, comprising:
a housing forming an oil sump;
a lubricant supply device comprising a pump, a filter, and an oil cooler;
at least one lubrication point incorporated in the oil circuit;
at least one direction control valve with at least two switching positions and at least three ports, the at least three ports including a first port, a second port, and a third port; and
a bypass extending within the housing and configured to drain oil from the third port past the at least one lubrication point into the oil sump, wherein:
in a first switching position the first port and the third port are connected to each other in an oil-conducting manner and disconnected from the second port,
in a second switching position, the first port and the second port are connected to each other in an oil-conducting manner and disconnected from the third port,
the lubrication point and the second port are connected to each other in an oil-conducting manner,
the lubrication point and the third port are not connected to each other in an oil-conducting manner, and
the entire bypass extends within the housing and the at least one direction control valve.

2. The gearbox arrangement according to claim 1, wherein the third port is not connected to any lubrication point in an oil-conducting manner.

3. The gearbox arrangement according to claim 1, further comprising at least one component incorporated in the oil circuit,
wherein the at least one component and the first port are connected to one another in an oil-conducting manner.

4. The gearbox arrangement according to claim 3, wherein the at least one component is arranged outside the housing.

5. The gearbox arrangement according to claim 1, wherein the oil circuit is fed from the oil sump and the third port is connected to the oil sump in an oil-conducting manner.

6. The gearbox arrangement according to claim 1, further comprising a dirty oil tank to which the third port is connected in an oil-conducting manner.

7. The gearbox arrangement according to claim 6, wherein the dirty oil tank is arranged outside the housing.

8. A method of flushing the gearbox arrangement according to claim 1, the method comprising:
moving the at least one direction control valve to the first switching position;
conveying oil through the oil circuit; and
moving the at least one direction control valve to the second switching position.

9. A method of repairing the gearbox arrangement according to claim 3, the method comprising:
removing the at least one component;
repairing or replacing the at least one component;
installing at least one new component; and
flushing the gearbox arrangement.

10. The method of claim 9, wherein flushing the gearbox arrangement comprises:
moving the at least one direction control valve to the first switching position;
conveying oil through the oil circuit; and
moving the at least one direction control valve to the second switching position.

11. A gearbox arrangement with an oil circuit, comprising:
a housing forming an oil sump;
a lubricant supply device comprising a pump, a filter, and an oil cooler;
at least one lubrication point incorporated in the oil circuit;
at least one direction control valve with at least two switching positions and at least three ports, the at least three ports including a first port, a second port, and a third port;
a dirty oil tank to which the third port is connected in an oil-conducting manner; and
a bypass extending within the housing and configured to drain oil from the third port past the at least one lubrication point into the oil sump, wherein:
in a first switching position the first port and the third port are connected to each other in an oil-conducting manner and disconnected from the second port,
in a second switching position, the first port and the second port are connected to each other in an oil-conducting manner and disconnected from the third port,
the lubrication point and the second port are connected to each other in an oil-conducting manner,
the lubrication point and the third port are not connected to each other in an oil-conducting manner.

12. A method of flushing a gearbox arrangement with an oil circuit, the gearbox arrangement comprising:
a housing forming an oil sump,
a lubricant supply device comprising a pump,
a filter, and an oil cooler, at least one lubrication point incorporated in the oil circuit, at least one direction control valve with at least two switching positions and at least three ports, the at least three ports including a first port, a second port, and a third port, and a bypass extending within the housing and configured to drain oil from the third port past the at least one lubrication point into the oil sump, wherein:

in a first switching position the first port and the third port are connected to each other in an oil-conducting manner and disconnected from the second port, in a second switching position, the first port and the second port are connected to each other in an oil-conducting manner and disconnected from the third port, the lubrication point and the second port are connected to each other in an oil-conducting manner, the lubrication point and the third port are not connected to each other in an oil-conducting manner, the method of flushing the gearbox arrangement comprising:

moving the at least one direction control valve to the first switching position;

conveying oil through the oil circuit; and moving the at least one direction control valve to the second switching position.

* * * * *